Figure 1:
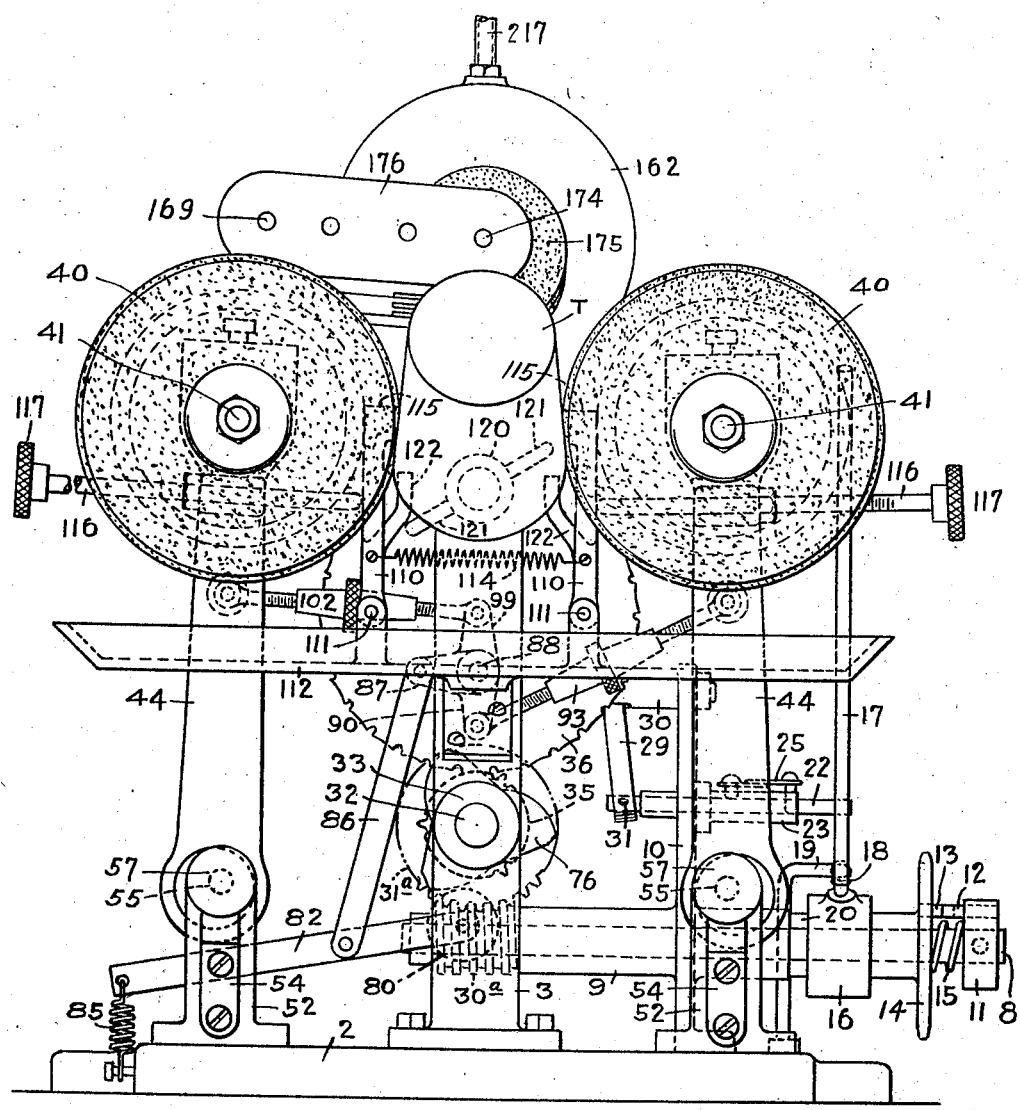

Feb. 1, 1927.

J. B. GREER 1,615,978

GLASS CUTTING MACHINE

Filed Sept. 14, 1923      6 Sheets-Sheet 1

INVENTOR
James Boyd Greer
By Kay, Totten & Brown
Attorneys

Feb. 1, 1927.
J. B. GREER
GLASS CUTTING MACHINE
Filed Sept. 14, 1923
1,615,978
6 Sheets-Sheet 2
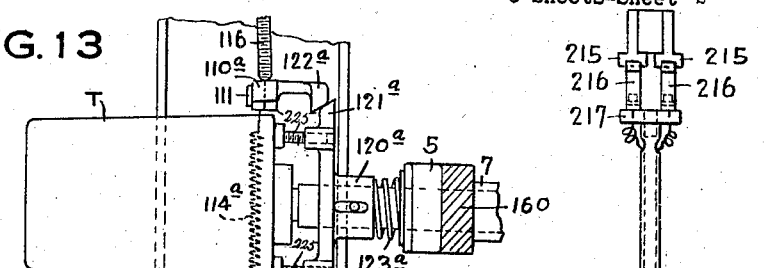
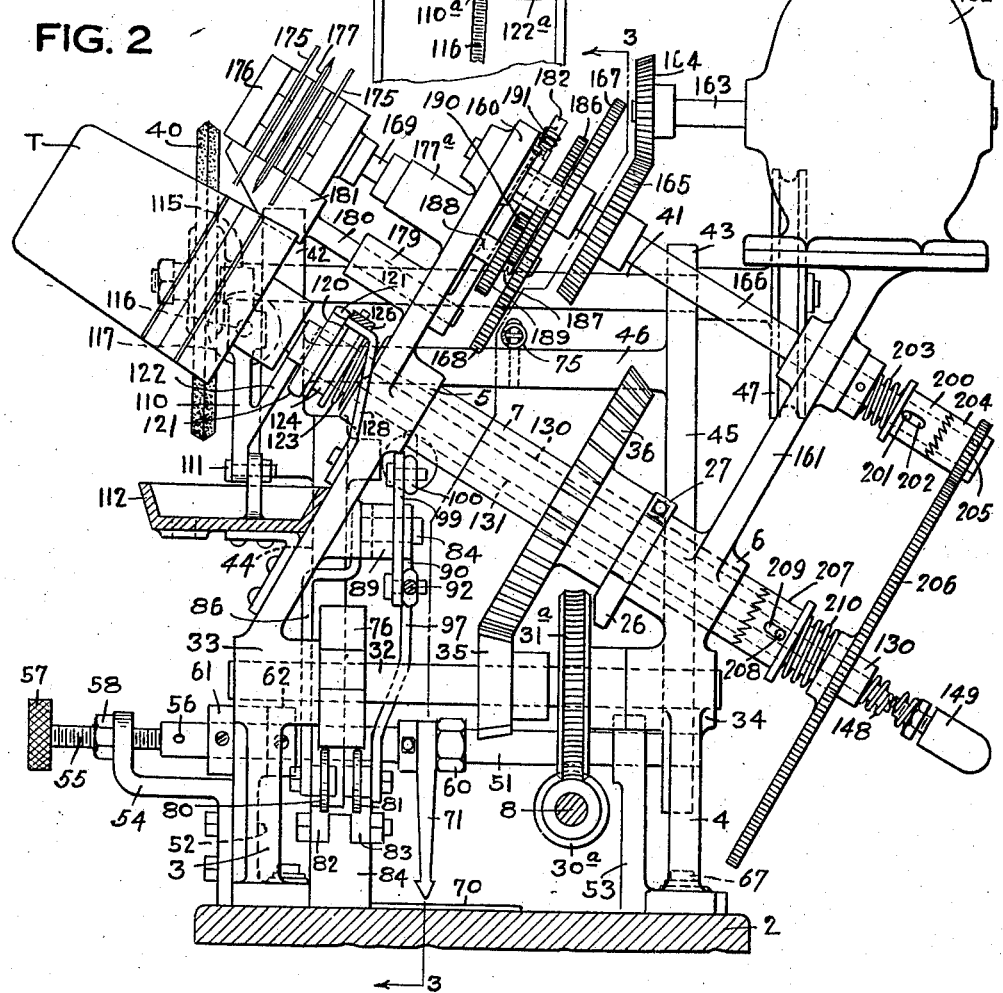
FIG. 13
FIG. 2
INVENTOR
James Boyd Greer
By Kay, Totten & Brown,
Attorneys Feb. 1, 1927.

J. B. GREER 1,615,978

GLASS CUTTING MACHINE

Filed Sept. 14, 1923

6 Sheets-Sheet 3

INVENTOR
James Boyd Greer
By Kay, Totten & Brown,
Attorneys

Feb. 1, 1927.

J. B. GREER 1,615,978

GLASS CUTTING MACHINE

Filed Sept. 14, 1923     6 Sheets-Sheet 5

INVENTOR
James Boyd Greer
By Kay, Totten Brown
attorneys

Feb. 1, 1927.

J. B. GREER 1,615,978

GLASS CUTTING MACHINE

Filed Sept. 14, 1923   6 Sheets-Sheet 6

INVENTOR
James Boyd Greer.
By Kay, Totten Brown,
Attorneys

Patented Feb. 1, 1927.

1,615,978

UNITED STATES PATENT OFFICE.

JAMES BOYD GREER, OF PITTSBURGH, PENNSYLVANIA.

GLASS-CUTTING MACHINE.

Application filed September 14, 1923. Serial No. 662,732.

My invention relates to machines for cutting designs upon tumblers, goblets, vases, and hollow glassware in general. It has special reference to the type of glass-cutting machine wherein the glass article to be decorated is held upon an intermittently rotated chuck, and the design is applied to the glass by means of one or more continuously rotated wheels which reciprocate toward and away from the chuck so as to engage the glass in the intervals between the partial rotations of the chuck.

One object of my invention is to simplify the construction of machines of the character indicated, and to produce a machine which shall operate with great accuracy and which shall be constructed from a minimum number of parts.

Another object of my invention is to provide a glass cutting machine having a wide range of adjustments, whereby the machine may be readily adapted to cut various designs upon glassware of different sizes and shapes, and in which none of the several adjustments shall be capable of working loose.

A further object of my invention is to provide improved means for rotating the chuck, whereby the partial rotations of the chuck shall be made exactly uniform.

A still further object of my invention is to provide a glass-cutting machine of the character indicated, wherein friction shall be reduced by eliminating the slides which have heretofore been employed for carrying the cutting wheels and their attachments.

A still further object of my invention is to provide a glass-cutting machine wherein the shafts which carry the cutting wheels shall be set at an angle to each other and may be adjusted to cause the cutting wheels to engage perpendicularly the sides of tapered or curved glass articles, thereby doing away with the necessity of specially dressing the grinding wheels to conform to various shapes of ware.

A still further object of my invention is to provide a glass cutting machine which shall be capable of producing decorations in the nature of wreaths or other discontinuous markings, and which shall also be capable of cutting continuous bands upon the glassware, such bands being in accurate registry with the wreaths or other like decorations, and both the wreaths and the bands being cut without removing the glass article from the chuck.

A still further object of my invention is to provide a glass cutting machine which shall include design-cutting mechanism and banding mechanism in a single self-contained unit which shall be capable of being mounted with other similar units upon a rotary table or other conveyor, and to provide means for operating the design-cutting and band-cutting mechanisms in suitable succession.

A still further object of my invention is to provide a glass-cutting machine wherein two cutting wheels are arranged upon opposite sides of a chuck and are moved toward and away from the chuck, and in which each one of the cutting wheels is capable of moving independently of the other cutting wheel.

A still further object of my invention is to provide an improved compensating device for causing the cutting wheels of a glass-cutting machine to form cuts of uniform depth in the glassware, irrespective of whether the ware is of regular or irregular contour.

A still further object of my invention is to provide a glass-cutting machine having indicating means whereby the machine may be quickly and accurately set up for various designs without requiring great skill on the part of the operator, and also without preliminary trials which consume time and which waste glassware.

Figure 3:
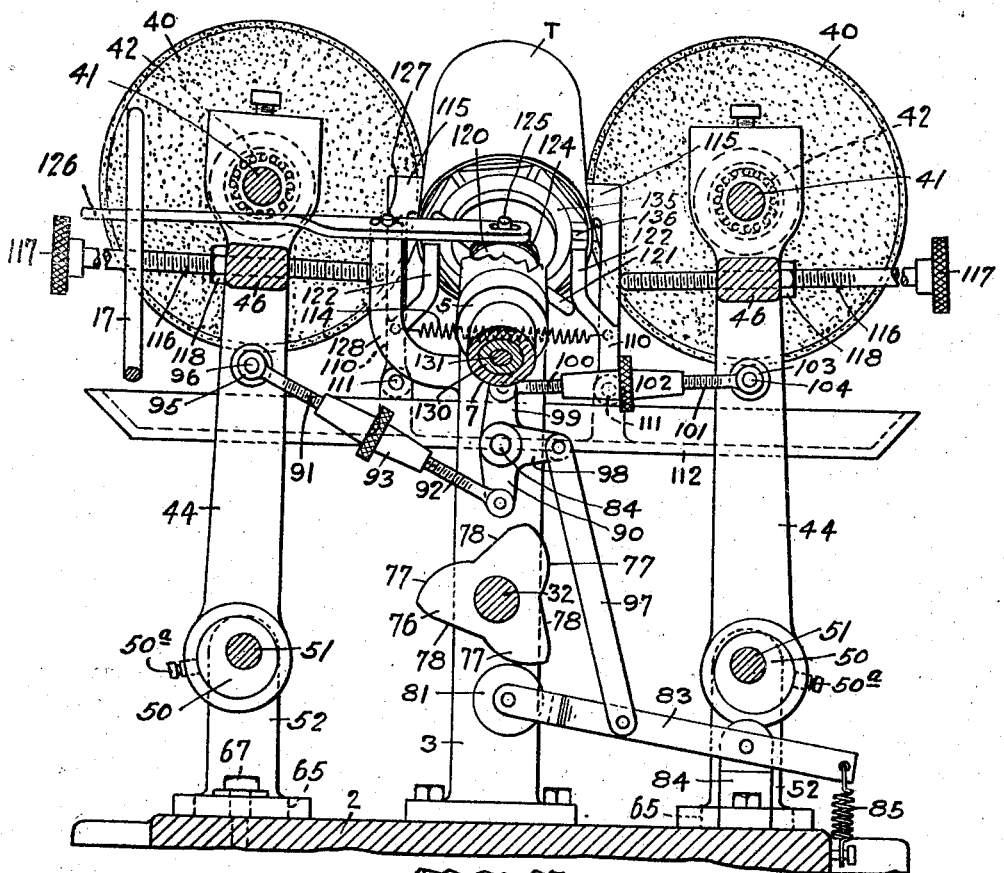
Figure 4:
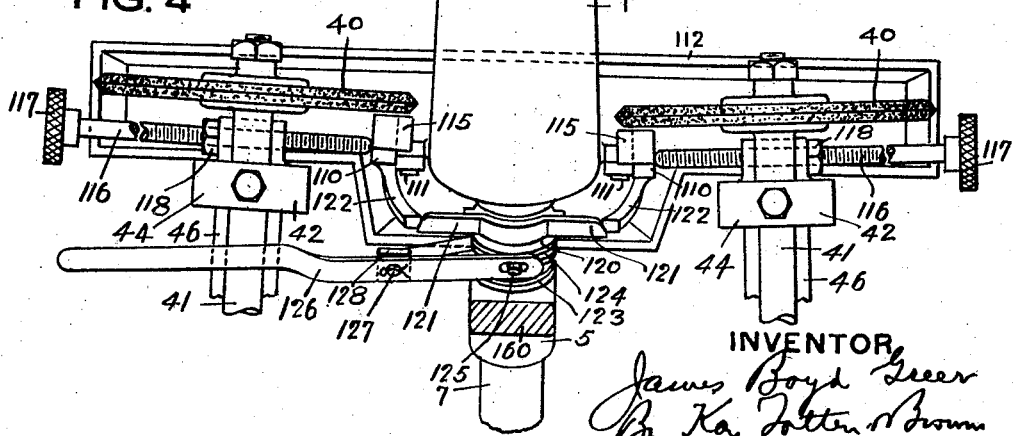
Figure 5:
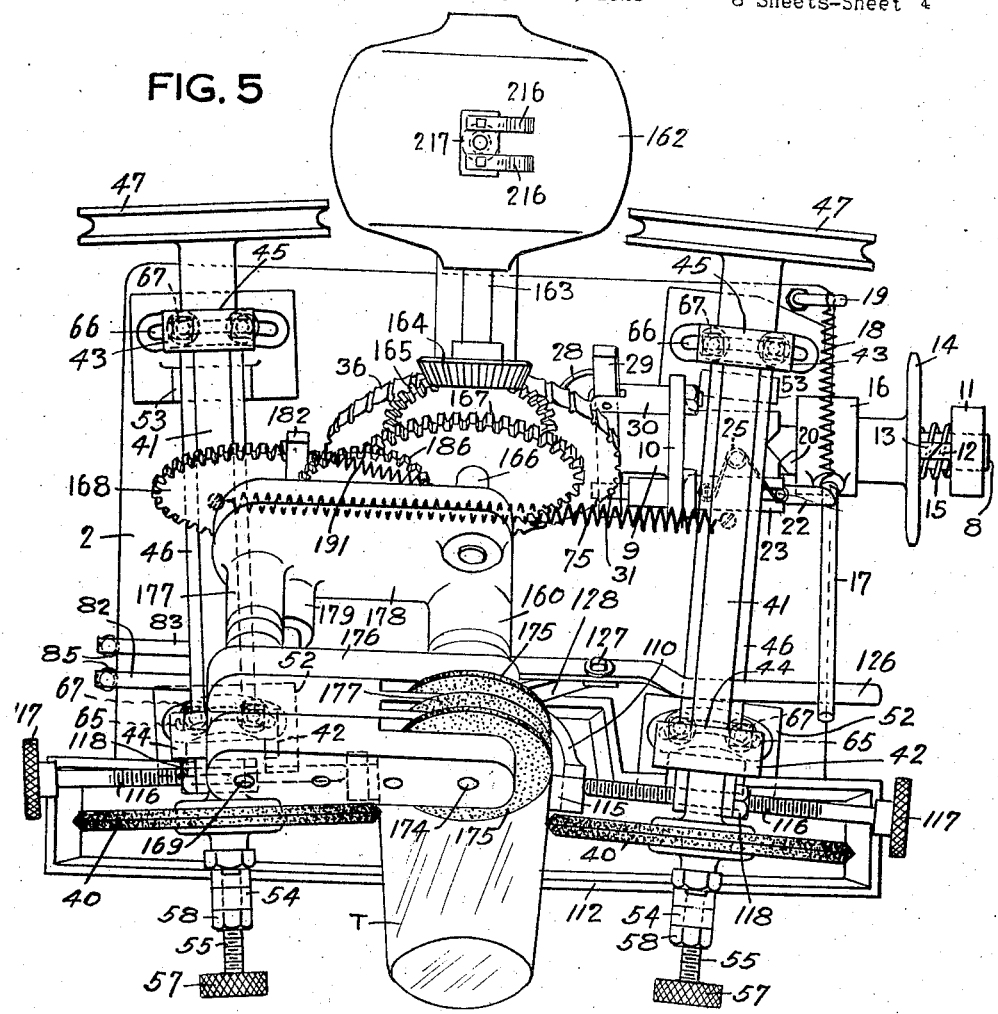
Figure 6:
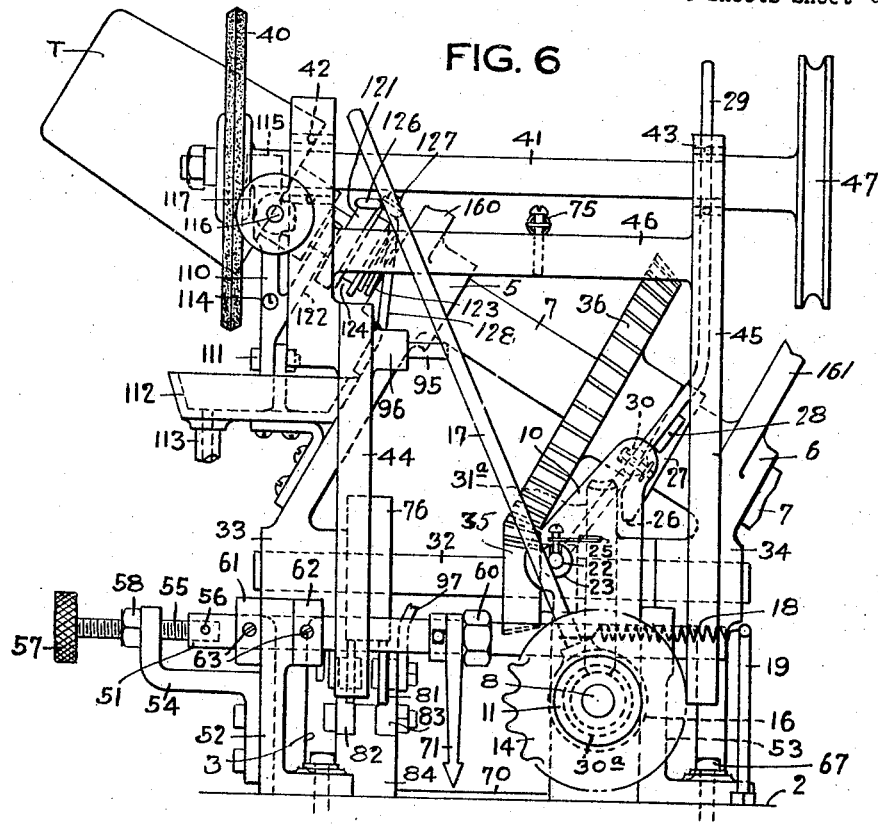
Figure 7:
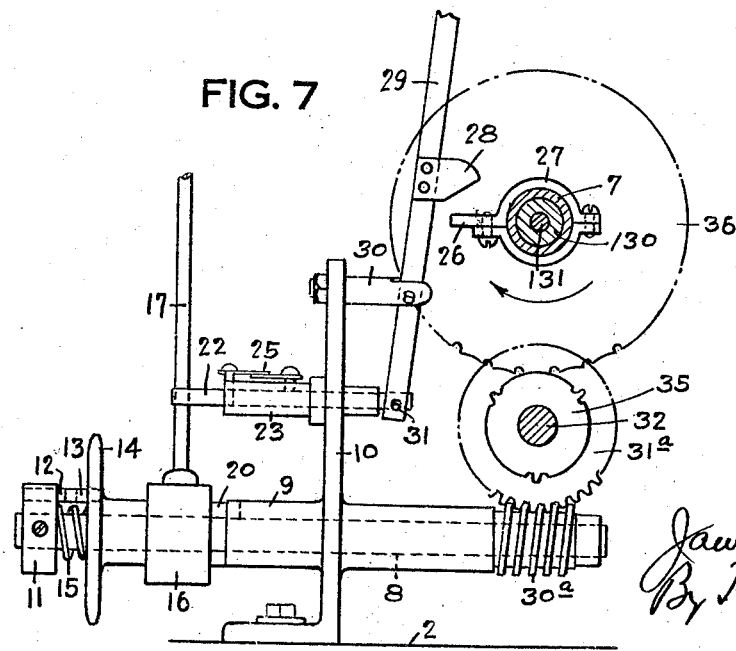
Figure 8:
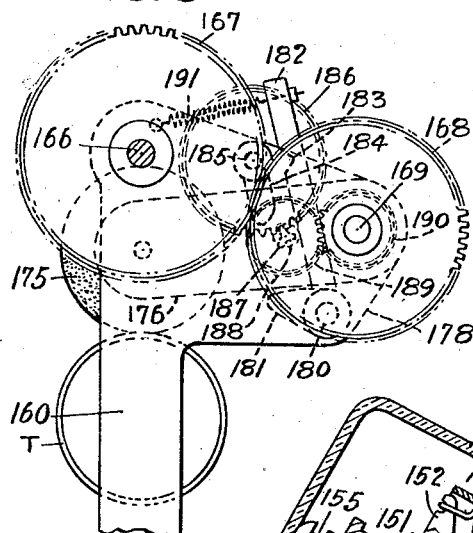
Figure 9:
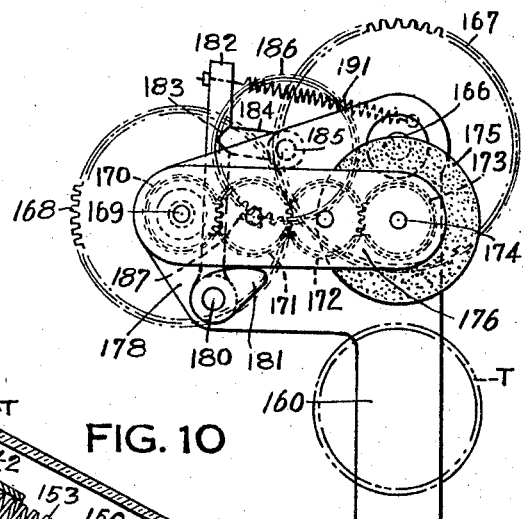
Figure 10:
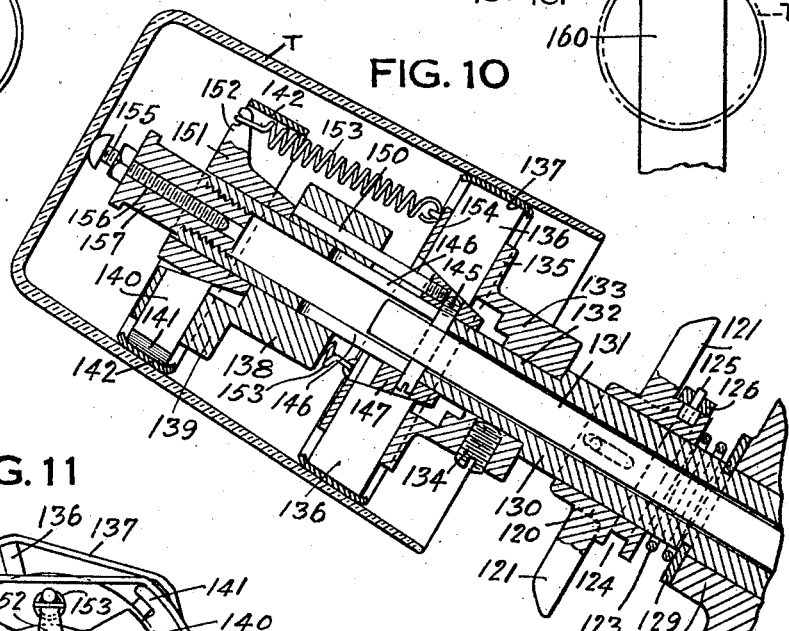
Figure 11:
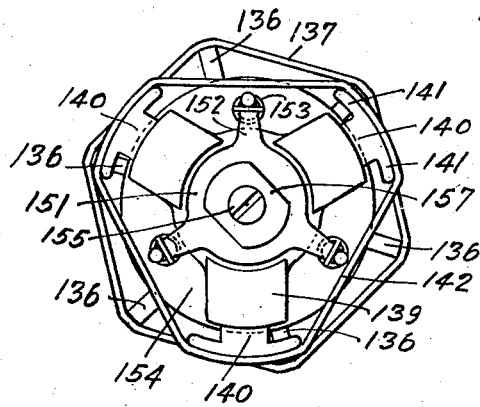

Other objects and advantages of my machine will appear from the following description, taken in connection with the accompanying drawings in which:

Fig. 1 is a front elevational view of a complete glass-cutting and banding unit constructed in accordance with my invention; Fig. 2 is a side elevational view of the same machine, with parts in section, as seen from the left of Fig. 1; Fig. 3 is a vertical sectional view taken substantially on the line 3—3, Fig. 2, with parts in elevation looking toward the front of the machine; Fig. 4 is a plan view of a portion of the machine, showing the relation of the cutting wheels to the article being cut, and the construction of the compensating device; Fig. 5 is a plan view of the complete machine; Fig. 6 is a side elevational view of the design-cutting mechanism as seen from the left of Fig. 1, the banding mechanism being omitted; Fig. 7 is a fragmentary rear elevational view showing the main drive and throw-out mechanism; Fig. 8 is a front elevational view showing somewhat diagrammatically the manner in which the banding wheels are mounted and operated; Fig. 9 is another view of the banding mechanism taken from the opposite side with respect to Fig. 8; Fig. 10 is an enlarged longitudinal sectional view through the chuck, showing a tumbler in position thereon; Fig. 11 is an end view of the chuck; Fig. 12 is a side elevational view of a tumbler having a design produced by the machine shown in the previous figure, and Fig. 13 is a fragmentary view showing a modified method of operating the compensating device.

The general features of the machine herein shown include a chuck carried upon an inclined chuck shaft and rotated intermittently by means of a novel arrangement of intermittent gears; pivoted frames carrying the cutting wheels and rocked simultaneously upon their pivots so as to move the cutting wheels toward and away from the chuck; a compensating device associated with the chuck and the grinding wheels; a throw-out device for stopping the action of the grinding wheels after the design has been completed; and a banding device so arranged as to rotate the chuck continuously after the first design has been completed, and to apply to the surface of the glass one or more banding wheels which operate to cut circular bands upon the ware in accurate registry with the design applied to the glass by means of the cutting wheels.

In the drawing the numeral 2 indicates a base upon which are rigidly mounted a front standard 3 and a rear standard 4. A front chuck shaft bearing 5 is carried by the standard 3, and a rear chuck shaft bearing 6 is carried by the rear standard 4. A hollow shaft 7 is rotatably supported in the bearings 5 and 6 and transmits rotary movement to a chuck adapted to carry the glassware to be decorated. The construction and operation of this chuck will be described below.

*The main drive.*

Power for rotating the hollow shaft 7 is derived from a horizontal shaft 8 which is mounted in a long bearing-sleeve 9 carried by a standard 10. The power shaft 8 carries at its outer end a clutch member 11 which has a clutch tooth 12 adapted to engage a corresponding clutch tooth 13 which is carried by a sprocket wheel 14 that is mounted loosely on the shaft 8 and is connected to any suitable source of power by means of a sprocket chain, not shown. A spring 15 surrounds the shaft 8 between the clutch member 11 and the sprocket wheel 14 and tends to force the sprocket wheel to the left, Fig. 1, so as to disengage the clutch teeth 12 and 13.

A shifting collar 16 is loosely mounted on the shaft 8 adjacent to the hub of the sprocket wheel 14 and carries a lever 17 to which is attached one end of a spring 18, Fig. 6, the other end of which is secured to some convenient stationary part of the machine such as a bracket 19 which is carried by the base 2. The collar 16 has a lateral wedge-shaped tooth 20, Fig. 7, which is adapted to engage a notch in the end of the shaft bearing 9. This notch acts as a cam when the collar 16 is turned by means of the lever 17, forcing the tooth 20 out of the notch and thus moving the sprocket wheel 14 to the right, Fig. 1, and to the left, Fig. 7, against the compression of the spring 15, and thereby causing the clutch tooth 13 to engage the clutch tooth 12, thus driving the shaft 8.

A detent 22 is mounted slidably in a bearing 23 carried by the standard 10, as best shown in Fig. 7, and this detent is connected by means of a pin 24 to a spring 25 which tends to move the detent outwardly so that its tapered forward end is in the path of movement of the clutch-shifting lever 17. The detent 22 thus holds the lever 17 in the driving position as shown in Fig. 6, until the detent 22 is withdrawn from the path of the lever 17, whereupon the spring 18 moves the clutch lever 17 to the position in which the tooth 20 enters the notch in the bearing 9, whereupon the spring 15 separates the clutch teeth 13 and 12 and the power shaft 8 is stopped.

This throw-out movement of the detent 22 is produced by means of a lug 26 carried by a split collar 27 that is secured adjustably to the hollow chuck shaft 7 just above the rear chuck shaft bearing 6. The rotation of the chuck shaft brings the lug 26 into engagement with a lug 28 carried by a throw-out lever 29 which is pivotally mounted on a bracket 30 carried by the standard 10, and the lower end of which is connected at 31 to the inner end of the detent member 22. It will be seen by referring to Fig. 7 that when the chuck shaft 7 rotates in a clock-wise direction, as seen in this figure, to raise the lug 26, this lug will engage the lug 28 and will act through the lever 29 to withdraw the detent 22 from engagement with the clutch lever 17. It will also be seen that after the lug 26 passes beyond the lug 28, the detent 22 will be forced out again by the spring 25 in proper position to engage and lock the clutch lever 17 when the machine is again started.

The power shaft 8 carries a worm 30$^A$ which meshes with a worm 31$^A$ on a horizontal shaft 32 which is mounted in bearings 33 and 34 in the front and rear standards 3 and 4. The shaft 32 carries a small intermittent bevel pinion 35 which is here shown as having three teeth that mesh with notches in a larger intermittent bevel gear 36 which is secured to the hollow chuck shaft 7. The large intermittent gear 36 is provided with a number of dwells corresponding to the number of cuts that are to be made in the glass article during one complete rotation of the chuck shaft. A commercial line of cut glassware requires a number of different designs having different numbers of cuts, and I therefore preferably provide a set of interchangeable gears 36, any of which is adapted to be mounted on the chuck shaft 7 and to mesh properly with the intermittent pinion 35. The proportions of the gears 35 and 36 are so selected that the chuck shaft 7 is given successive partial rotation with suitable intervals of rest between them, such intervals being sufficient to permit the cutting wheels to move into, and out of engagement with the glass before the next partial rotation takes place.

I consider that this method of intermittently rotating the chuck shaft is an important improvement in machines of this character, since it does away with many complicated and troublesome parts, such as ratchets, pawls, and springs, which have heretofore been used in imparting intermittent movement to the chuck shafts in machines of this general type.

*The cutting wheel mechanism.*

Mounted on opposite sides of the chuck are two cutting wheels 40 of suitable abrasive material. Each of the cutting wheels 40 may be carried upon the forward end of a horizontal shaft 41 which is mounted in ball bearings 42 and 43 that project above a swinging frame composed of upright members 44 and 45 connected by a horizontal member 46. Pulleys 47 are secured to the rear ends of the shafts 41 and may be driven continuously by means of suitable driving belts. These belts and their driving means are not shown herein, since my present invention is not concerned with this part of the apparatus.

The lower ends of the uprights 44 and 45 composing each of the swinging cutter frames are pivotally mounted so that the cutter frames may be swung to carry the cutting wheels 40 toward and away from the chuck. As shown, the lower ends of the uprights 44 and 45 are mounted upon eccentrics 50 that are carried adjustably by stationary horizontal shafts 51. Each of the eccentrics 50 is individually adjustable upon its supporting shaft 51 and is secured in its adjusted position by means of a set screw 50ᵃ.

The arrangement of the eccentrics 50 and the shafts 51 should be particularly noted, since it provides in a simple manner for adjusting the cutting wheels forward and back, and also laterally, vertically and angularly. Each of the horizontal shafts 51 which carries the eccentrics 50 is mounted in bearings in a short standard 52 at the front of the machine and in a short standard 53 at the rear of the machine. The front standard 52 carries a forwardly projecting bracket 54, the outer and upper portion of which is provided with a screw-threaded opening through which extends a screw 55, the inner end of which is received in a loose fitted opening in the forward end 56 of the shaft 51 by a pin. A knurled knob or other turning means 57 is carried by the outer end of the screw 55 and it will be evident that by turning the screw 55 the shaft 51 will be moved lengthwise and that this movement is accompanied by similar forward or rearward movement of the cutter frame and cutting wheel carried by this shaft. The lengthwise position of the shaft is fixed by means of a lock nut 58 carried by the screw 55 and bearing against the outer surface of the bracket 54.

The angular position of both of the eccentrics 50 carried by each of the shafts 51 may be adjusted by turning the shaft 51, suitably by means of a wrench applied to a nut 60 which is carried by the shaft 51. When the eccentrics 50 are thus rotated, they vary the position of the axis around which the cutter frame rocks, and this axis may be shifted both laterally and vertically according to the turning movement imparted to the eccentrics 50. A certain amount of angular adjustment is also possible through the individual adjustment of these eccentrics. The shafts 51 are secured in their adjusted positions, so that the eccentrics 50 will not turn during the operation of the machine, by means of collars 61 and 62 which surround each shaft 51, and bear against the front and rear surfaces of the front shaft bearings as shown in Fig. 6. These collars are secured to the shaft 51 by means of set screws 63 which also assist the lock nuts 58 in preventing lengthwise movement of the shafts 51. The use of these collars prevents accidental loosening of any of the adjustments when the machine is running.

The cutter shafts 41 are preferably adjusted before the machine is put in operation so that they will be parallel with the sides of the glass article upon the chuck, for example, a tumbler T. The advantage of this adjustment is that the cutting edges of the wheels 40 engage the sides of the glass perpendicularly and therefore make cuts in the glass which are symmetrical on both sides of the cut, without the necessity of specially dressing the cutting wheels as is necessary if the cutting wheel shafts are parallel to each other.

In order to provide for this angular adjustment of the shafts 41, the front and rear standards 52 and 53 which support the cutter frames are mounted for angular adjustment upon the base 2. To this end the base is provided with curved slots 65 at the front of the machine, and with other and longer curved slots 66 at the rear of the machine as best shown in Fig. 5. The standards 52 and 53 are secured in place by means of bolts 67 which extend through the slots 65 and 66, and which, when tightened, hold the cutter frames rigidly in their adjusted position. Some or all of the slots may be provided with graduations, if desired, so as to facilitate the proper angular adjustment of the cutter frames in accordance with the angle of the sides of the glassware being cut. After this angular adjustment of the cutter frames has been made, a final adjustment of the angular positions of the cutter shafts may be produced by turning the eccentrics 50 on the shafts 51. In this manner the cutting wheels may be brought very accurately to the desired angle with relation to the articles to be cut. This angular adjustment of the cutting wheels is also useful in cutting designs upon articles having curved surfaces, the angular adjustment being such that the cutting wheels engage the glass in a direction perpendicular to the tangent to the surface of the glass at the point of engagement.

In commercial work it is necessary to adapt a single machine of this character to cut a considerable number of different designs which are given arbitrary numbers. Thus, design No. 1 may consist of a double wreath such as that shown on Fig. 12, and having 24 double cuts upon the circumference of the glass; No. 2 design may have some other numbers of cuts and may be adapted to a smaller tumbler requiring a different lateral or front and rear adjustment of the cutting wheel, and so on. There has heretofore been considerable delay in setting up a glass cutting machine for different designs, a skilled workman being required to make the approximate adjustments, and the machine then being started, a number of trial articles being cut, and further adjustments being made before the correct operating condition is reached. This wastes not only time but glassware, since the trial articles must usually be discarded.

In my present machine I provide means for indicating to the operator the adjustment of the cutter frames which is necessary for each commercial design. Such indicating means includes a plate 70 secured to the base 2 beneath each of the shafts 51, and a pointer 71 carried loosely by each of the shafts 51. The plates 70 are graduated with transverse and lengthwise markings indicating the proper position of the pointer for each design to be cut. These markings are arrived at for each machine by a series of tests which fix once for all the necessary adjustment for each design. The position of the pointer for each adjustment is marked on the indicator plate, and when this has been done it is only necessary, in changing to a new design, for the operator to move the shafts 51 and 70 bring the pointers 71 above the appropriate marks on the plates 70, thus producing the proper set-up for the design selected.

The horizontal members 46 of the swinging frames which carry the cutting wheels 40 are connected by means of a helical spring 75 which tends to pull the upper swinging parts of the cutter frame together, thereby drawing the cutting wheels toward the chuck. It will be noted that by reason of this spring connection each of the cutting wheels is free to stop at any point in its travel toward the chuck, independently of the other cutting wheel. It will also be noted that the movement of the cutting wheels toward and away from the chuck is accomplished without the use of slides, and that friction is thus avoided.

The frames carrying the cutting wheels are rocked to move the cutting wheels away from the chuck by means of a cam 76 which is secured to the horizontal shaft 32 adjacent to the front bearing 33. As best shown in Fig. 3, the cam 76 has three similar portions 77 which are spirally curved and which are separated by straight surfaces 78, so that three reciprocations of the cutter frames are produced by each rotation of the shaft 32.

The cam 76 engages two rollers 80 and 81 which are arranged side by side, as best shown in Fig. 2, and are carried respectively by levers 82 and 83 which are mounted pivotally near their outer ends upon a short standard 84. Springs 85 are secured between the base 2 and the outer ends of the levers 82 and 83 and hold the rollers 80 and 81 in engagement with the peripheral surface of the cam 76.

The two levers 82 and 83 are employed to actuate independently the frames which carry the cutting wheels. The lever 82 which is nearest the front of the machine, and is therefore seen on Fig. 1, actuates the swinging frame at the right of Fig. 1 while the other lever 83, which is seen on Fig. 3 actuates the swinging frame at the left of Fig. 1 and at the right of Fig. 3. The lever 82 is connected by means of a link 86 to the arm 87 of a bell crank lever which is mounted upon a stationary pivot pin 88 that is carried by the central standard 3. The lever arm 87 is carried by a collar 89 which loosely surrounds the pivot pin 88, and which also carries a downwardly projecting lever arm 90 forming the other arm of the bell crank lever which is actuated through the link 86. To the lower end of the lever arm 90 is secured one end of a turn-buckle link composed of screw threaded rods 91 and 92 which are connected by a turn buckle 93. The outer end of the screw-threaded rod 91 has an eye 94 which fits over a pin 95 carried by a boss 96 which may be formed integral with the vertical arm 44 of the swinging frame, as shown in Fig. 6, and at the left of Fig. 3.

In a similar manner the lever 83 which operates the swinging frame at the left of Fig. 1, and at the right of Fig. 3, is connected by means of a link 97 to one arm 98 of a bell crank lever which is mounted on the stationary pivot pin 88 already referred to and which has an upwardly extending arm 99 to which is connected one end of a turnbuckle link composed of screw-threaded sections 100 and 101 connected by a turn-buckle 102. The outer end of the threaded rod 101 is provided with an eye 103 which fits over a pin 104 carried by the front vertical member 44 of the cutter wheel frame at the left of Fig. 1, and at the right of Fig. 3.

The turn-buckles through which the rocking cutter wheel frames are connected to the operating cam provided for adjusting the space between the cutting wheels 40 to accommodate glass articles of different widths, and also provide for the use of cutting wheels of different diameters.

The compensating device.

Commercial tumblers and other circular hollow articles are not always perfectly round, and it is important that the cutting wheels for forming designs upon such hollow ware be arranged to make cuts of uniform depth not only on ware that is exactly circular, but on ware that may be slightly flat at some points and unduly curved at others. If the cutting wheels are always stopped at the same point, the flatter portions of the article may be cut too little or not at all, while the protruding portions may be cut entirely through the wall of the article.

In order to cause the cutting wheels 40 of my present machine to produce cuts of uniform depth, I provide a pair of pivoted arms which are automatically separated to allow the tumbler, or other article, to be placed upon the chuck and which then close upon the surface of the article. These pivoted arms extend into the path of screws or other adjustable members carried by the pivoted cutter wheel frames. These adjustable members limit the movement of the cutting wheels toward the chuck by engaging the pivoted arms just referred to without actually coming in contact with the glass itself. When the design has been completed the compensator arms are moved away from the glass and therefore do not interfere with the removal of the completed article and the placing of a new article upon the chuck.

In the compensating mechanism shown in Figs. 3, 4 and 5 of the drawings, two arms 110 are pivoted at the points 111 to some convenient stationary part of the machine. As shown, these arms are supported by a trough 112 which extends beneath the cutting wheels 40 and which receives and drains away through a pipe 113 the lubricating water which is supplied to the cutting wheels through suitable piping, not shown. The pivoted arms 110 are connected by means of a spring 114 which tends to draw these arms toward the chuck. At their upper ends, the arms 110 may be provided with heads 115 of suitable shape to engage the sides of the tumbler T which is shown in position on the chuck. The front upright members 44 of the swinging cutter wheel frames are provided with screw-threaded transverse openings through which screws 116 extend toward the compensator arms 110. The screws 116 may be provided with knurled heads 117 and with lock-nuts 118. The screws 116 are adjusted in accordance with the depth of cut that is desired, and when the frames are rocked toward the glass the ends of the screws 116 engage the members 110 and thereby limit the depth of the cut. This depth is regulated by the engagement of the heads 115 with the glass, so that uniform depth of cut is assured. It will be noted that the cutting wheels are free to stop independently and at different distances from the chuck if the walls of the glass article are irregular, this independent movement being secured by the use of the spring 75 which connects the cutter wheel frames and draws them yieldingly toward the chuck.

For the purpose of moving the compensator arms 110 away from the glass article after the design has been finished, a collar 120 is mounted upon the chuck shaft in such a way as to rotate with this shaft, while having a certain amount of sliding movement upon this shaft. The collar 120 carries two oppositely extending arms 121 which have beveled ends that are adapted to engage fingers 122 which extend inwardly and rearwardly from the compensator arms 110, as shown in Figs. 3 and 4. A spring 123, Fig. 2, surrounds the chuck shaft and tends to force the collar 120 and the arms 121 toward the fingers 122, thereby separating the fingers 122 and moving apart the compensator arms 110. A disc having a beveled edge may be carried by the collar 120 instead of the arms 121, and will operate in a similar way.

In order to control the movement of the collar 120, this collar is provided with a peripheral groove 124 in which is received a pin 125 carried by a shifting lever 126 which is pivoted at 127 to a stationary bracket 128. The lever 126 extends into the path of movement of the clutch lever 17 which controls the operation of the chuck and the cutting wheels. When the lever 17 moves to its forward position, shown in Fig. 5, it rocks the lever 126 upon its pivot 127 and withdraws the collar 120 against the compression of the spring 123 so as to release the fingers 122, thereby permitting the compensator heads 115 to be drawn into engagement with the surface of the glass article by means of the spring 114. As the cutting operation proceeds, the collar 120 rotates with the chuck shaft, carrying with it the fingers 121, and when the chuck shaft has made one complete revolution, the fingers 121 are again in the same position as when the operation was started. Thereupon the lever 17 is tripped by the withdrawal of the detent 122 in the manner described above, and the movement of the lever 17 to the rear releases the lever 126 and permits the spring 123 to force the fingers 121 upward and forward into engagement with the fingers 122. This separates the compensator arms so that they do not interfere with the removal of the tumbler or with placing a new tumbler upon the chuck.

Another form of compensator device is shown in Fig. 13. This device, like that which has just been described in connection with Figs. 3, 4 and 5, includes a pair of compensator arms 110 pivoted at 111 to a stationary part of the machine, such as the trough 112, and connected by a spring 114$^a$ which tends to draw these arms toward the chuck. The screws 116 co-operate with the arms 110$^a$ in the same manner as with the arms 110 described above.

The device of Fig. 13 differs from that of the preceding figures in the method of causing the compensator arms 110$^A$ to move into engagement with the glass at the beginning of the cutting operation, and moving away from the glass at the end of the operation. As shown in Fig. 13, a collar 120$^a$ is mounted upon the chuck shaft so as to rotate with this shaft and to have sliding movement thereon. The collar 120$^a$ has two oppositely extending arms 121$^a$ or an equivalent disc of similar diameter, the arm or the disc having beveled outer surfaces which engage fingers 122$^a$ extending inwardly and rearwardly from the compensator arms 110. A spring 123$^a$ surrounds the chuck shaft and tends to force the collar 120$^a$ toward the fingers 122$^a$. The arms 121$^a$ carry adjustable screws 225 which engage the edge of the tumbler T when the tumbler is placed upon the chuck.

When there is no glass upon the chuck, the compensator arms are in their open position because the spring 123$^a$ forces the arms 121$^a$ into engagement with the fingers 122$^a$, and thus holds the arms 110$^a$ in their outer position. When a glass is placed upon the chuck, its edge engages the screws 225 and moves the arms 121$^a$ away from the fingers 122$^a$, whereupon the spring 114$^a$ moves the compensator arms into engagement with the glass. When the glass is removed from the chuck, the spring 123$^a$ immediately returns the fingers 121$^a$ to the position where they separate the compensator arms so that they do not interfere with placing a new glass upon the chuck.

The chuck.

The chuck construction which I prefer to employ is shown in detail in Figs. 10 and 11. The hollow chuck shaft 7 which carries the intermittent gear wheel 36, surrounds a second hollow shaft 130 which in turn encloses an operating rod 131. In order to prevent the intermediate hollow shaft 130 from moving lengthwise, this shaft is provided with an annular groove just above the stationary bearing 5, and a flat ring 129, which is made in sections, fits into this groove and is screwed upon the upper surface of the bearing 5. The intermediate hollow shaft 130 has a reduced outer portion 132 to which a collar 133 is secured by means of a set screw 134. The collar 133 has an integral enlargement 135 which is provided with a series of radial slots through which extend flat jaws 136 which are capable of moving radially outward to grip an article, and inward to release the article. A rubber band 137 extends around the jaw members 136 as best shown in Fig. 11.

The chuck is also provided with an outer set of jaws which are carried by a collar 138, which, like the collar 133, is secured to the reduced portion 132 of the hollow shaft 130. The collar 138 is provided with three integral radial projections 139 which are provided with radial openings through which extend jaw members 140. The outer ends of the jaw members 140 are preferably widened, as shown at 41, suitably by securing short curved strips of thin metal to the ends of these jaw members, in order that the jaws may have suitable width of bearing surface upon the interior of the glass article. This is important in the case of optic ware having its inner surfaces composed of flat bands, for unless the outer jaws have sufficient effective width to engage more than one of these flat bands, the article will be tilted upon the chuck and will therefore be cut improperly. A rubber band 142 extends around the outer ends of the jaws.

The sliding central rod 131 which extends through the shaft 130 is employed for the purpose of expanding the chuck jaws 136 and 140. Near its outer end the rod 131 is pierced transversely to receive a screw 145 which extends through slots 146 formed in the hollow shaft 130 and serves to secure to the rod 131 a cone shaped collar or spreader 147, the outer surfaces of which engage the tapering inner ends of the lower chuck jaws 136. The rod 131 is normally retracted by means of a spring 148, Fig. 2, which is compressed between the lower end of the intermediate chuck shaft 130 and a head 149 which is secured to the lower end of the rod 131. The spring 148 is made strong enough to expand the jaws 136 and to cause these jaws, acting through the rubber band 137, to tightly grip the interior of the glass article.

Three small distance rods 150, one of which is shown in Fig. 10, extend through openings in the upper collar 138. The lower ends of the rods 150 rest upon the upper surface of the expanding cone 147, and the upper ends of these distance rods rest against the lower surface of another expanding cone member 151, the sides of which engage the tapering inner ends of the upper clutch jaws 140. The upper expanding cone member 151 carries three laterally extending hooks 152, and three springs 153 are connected between the hooks 152 and a plate 154 which is secured to the upper surface of the lower chuck collar 133.

When the chuck is to be contracted so as to release the tumbler T, the rod 131 is moved upward manually or by any suitable automatic means, not shown, and carries with it the lower expanding cone 147 which, acting through the distance rods 150, pushes up the expanding cone 151. The chuck jaws 136 and 140 are thus permitted to move inwardly under the influence of the stretched rubber bands 137 and 142. The tumbler T may then be removed and replaced by another tumbler. When the rod 131 is released, the spring 148 returns this rod to its lower position, causing the lower expanding cone 147 to force the clutch jaws 136 outwardly. At the same time, the springs 153 draw down the upper expanding cone member 151, thereby expanding the upper clutch jaws 140. This arrangement provides for simultaneous but independent operation of the upper and lower chuck jaws so as to enable these jaws to properly grip hollow glass articles of different shapes.

As an additional guide for positioning the glass articles upon the chuck, I provide a stop screw 155, Figs. 10 and 11 which screws into a threaded opening 156 extending through a plug 157 that is screwed into the outer end of the intermediate hollow clutch shaft 130. The screw 155 determines the extent to which the tumbler T can be forced down upon the chuck, and by suitably adjusting this screw I provide for positioning articles of different depth in proper relation to the cutting wheels.

The bander.

Mounted above the cutting wheels and their attachments is a banding device which preferably operates after the cutting wheels have finished their work upon the tumbler or other article. This bander is illustrated in the form used for making the design shown in Fig. 12 where the tumbler T is provided with a wreath consisting of cuts A together with the bands B above and below the wreath, and a narrower band C in the center of the wreath. It has heretofore been a matter of difficulty to produce a design of this character in which the bands are in exactly the proper relation to the cuts composing the wreath. This difficulty has been due largely to the fact that it has been necessary to perform the cutting and banding operations on separate chucks, the usual procedure being to cut the wreath on one machine and then transfer the tumbler to the chuck of another machine, which applies the bands. It is difficult, if not impossible, to place the tumbler upon the second chuck in exactly the right position to bring the bands in correct relation to the cuts composing the wreath, particularly when the ware is slightly irregular in shape as in some grades of commercial tumblers particularly of the optic type.

The bander with which my present machine is provided avoids this difficulty by operating upon the tumbler while it is still in its original position upon the chuck which holds it while the cutting wheels are producing the wreath. Therefore, the wreath and the bands are always in their correct relative position, which is determined by the adjustment of the banding wheels with respect to the cutting wheels.

As shown in the drawing, the bander is mounted upon two inclined standards 160 and 161 which rise respectively from the front and rear central standards 3 and 4 of the machine immediately above the bearings 5 and 6 of the chuck shaft. The rear standard 161 carries a small electric motor 162, to the armature shaft 163 of which is secured a bevel pinion 164 meshing with a bevel gear 165 on an inclined shaft 166 which also carries a spur gear wheel 167 meshing with a spur gear wheel 168 that is mounted on the lower end of an inclined shaft 169. The shaft 169 carries a spur gear wheel 170 which meshes with a spur gear wheel 171, as best shown in Fig. 9. The gear wheel 171 meshes with another similar gear wheel 172 and this in turn meshes with a gear wheel 173 on an arbor 174 to which is secured a banding wheel 175. The gear wheels 170 and 173 are enclosed within a gear box 176 which is mounted upon the shaft 169 so that the gear box and the banding wheels may be raised and lowered with respect to the chuck jaws directly beneath the banding wheels. As shown, three banding wheels are provided, each with its gear box and train of gearing, the two outer banding wheels 175 being adapted to form the bands B on the tumbler T, Fig. 12, while the intermediate banding wheel 177 forms the narrower central band C. The banding wheels 175 and 177 are separately driven through trains of gears driven from the shaft 169 as illustrated in Fig. 9 with respect to one of the wheels 175, or if preferred, all of the banding wheels may be mounted on the same arbor, in which case each train of gears operates singly and independently in order to follow the contour and irregularities of the article.

The shaft 169, upon which the gear boxes 176 are mounted and which drives the gearing for the banding wheels, is mounted in a bearing 177 that extends forwardly from a stationary plate 178 which projects laterally from the standard 160. The plate 178 also carries a bearing 179 through which extends a shaft 180. This shaft extends forward beneath the gear box 176 and carries a lifting member 181 in the end of a cam which engages the under side of the gear boxes 176 and raises the gear boxes to lift the banding wheels away from the chuck when the shaft 180 is rocked in a counter-clockwise direction, Fig. 9. This rocking movement of the shaft 180 is produced by means of an arm 182 which is secured rigidly to the shaft 180 and is provided with a notch 183 which is adapted to receive the end of a lug 184 carried by a shaft 185. The shaft 185 is slowly rotated by means of a gear wheel 186 which is secured to the shaft 185 and which meshes with a smaller three-toothed pinion 187 on a shaft 188. The shaft 188 carries a gear 189 which meshes with a gear 190 carried by the shaft 169. A spring 191 is connected between the upper end of the arm 182 and a stationary part of the machine, such as the bearing of the shaft 166, as shown in Figs. 8 and 9.

When the shaft 185 is in the position shown in Fig. 9, the lug 184 is received in the notch 183 of the arm 182 and thereby holds the arm against the tension of the spring 191 in such position that the lifting member 181 holds the gear box 176 in its elevated position, the banding wheels being then raised from the tumbler T. As soon as the shaft 18 rotates sufficiently to disengage the lug 184 from the notch 183, the weight of the gear boxes 176 and their attachments, assisted by the spring 191, causes the gear box and banding wheels to descend until the banding wheels engage the tumbler T, this position being shown in Fig. 8. The reduction gearing described above operates to turn the shaft 185 at a slow rate, and this gearing is preferably so proportioned that the shaft 185, with the lug 184, makes one complete revolution while the banding wheels are operating upon a single tumbler. As the lug 184 approaches the position of Fig. 9 it engages the arm 182 and lifts the banding wheels from the tumbler.

The motor 162 operates not only to drive the banding wheels but to rotate the chuck continuously while the banding wheels are in operation. For this purpose the inclined shaft 166 which, as stated above, is driven by the motor 162 through the bevel gears 164 and 165, is provided near its lower end with a toothed clutch member 200 which is slidably secured to the shaft 166 by means of pins 201 extending through slots 202 in the clutch member 200. The clutch member 200 is backed by a spring 203 and is provided with clutch teeth meshing with similar clutch teeth on the hub 204 of a spur pinion 205 which is loosely mounted on the lower end of the shaft 166. The pinion 205 meshes with a large spur gear 206 that is keyed to the intermediate hollow chuck shaft 130. A toothed clutch member 207 is slidably secured to the intermediate clutch shaft 130 above the gear wheel 206 by means of pins 208 extending through slots 209 in the clutch member 207. The teeth of the clutch member 207 mesh with similar clutch teeth formed on the lower end of the outer hollow chuck shaft 7. A spring 210 surrounds the intermediate chuck shaft 130 between the clutch member 207 and the hub of the gear 206 and keeps the teeth of the clutch member 207 in engagement with the teeth on the end of the chuck shaft 130.

By the arrangement just described, the chuck carrying the tumbler is rotated in a step-by-step manner by the main shaft 8 while the cutting wheels are in operation and is thereafter rotated continuously by the motor 162 while the banding wheels are in operation. The intermittent rotation is produced, as in the manner already described, through the large intermittent bevel gear 36 that is carried by the outer hollow chuck shaft 7. This motion is communicated through the clutch member 207 to the hollow intermediate clutch shaft 130 which carries the clutch head. During this operation the large gear 206 turns idly and also turns the pinion 205 on the shaft 166, but this shaft is not rotated because the teeth of the clutch members 200 and 204 are so shaped that they move idly past each other at this time. When, however, the intermittent rotation of the chuck is stopped by means of the throw-out device described above and the electric motor 162 is energized to drive the shaft 166, this motion is communicated through the clutch member 200 to the pinion 205 which drives the gear 206, and thereby rotates the intermediate clutch shaft 130 continuously. During this continuous rotation of the chuck 130 the teeth of the clutch member 107 pass idly over the teeth in the lower end of the outer clutch shaft 7, and therefore the train of gearing associated with the main shaft is not effected during the banding operation.

Any suitable means may be provided for energizing the electric motor 162 whenever it is desired to operate the banding wheels. If the machine is used as a separate unit, an ordinary switch may be employed for this purpose. I prefer, however, to mount a number of these machines upon a support such, for example, as the rotary table described and claimed in my copending application for Letters Patent, filed December 22, 1921, Serial No. 524,235. In such a multiple arrangement of the glass cutting and banding machines, it is desirable to provide each machine with its own motor, such as motor 162, and to provide automatic means for energizing each motor as it is brought to the place where the banding operation is to take place. I have shown somewhat diagrammatically in Fig. 2 of the drawing an arrangement by which this may be done. Stationary contact tracks 215 are suspended in any convenient manner at the point where the banding is to take place and above the level of the motor. The motor is provided with contact shoes 216 adapted to run beneath the tracks 215, and carried in a suitable support 217. Suitable electric connections are provided for supplying current to the contact tracks 215 and for connecting the contact shoes 216 to the motor. The contact tracks 215 are preferably arranged to be engaged by the shoes 216 just after the grinding wheels have been thrown out of operation.

*Operation.*

When the operation of the machine begins, the banding wheels are raised from the chuck, the compensator arms 110 are separated by means of the fingers 121, the sprocket wheel 14 is rotating idly, and the grinding wheels 40 are rotating but not reciprocating. By pressure applied manually or automatically to the head 149 on the lower end of the chuck rod 131, the clutch jaws are contracted and a tumbler T, or other glass article to be decorated, is placed upon the chuck and the head 149 is released, thereby causing the chuck jaws to expand and grip the tumbler firmly. The clutch lever 17 is then moved forward either manually or automatically. This engages the clutch on the main drive shaft 8 and at the same time presses forward the shifting lever 126 which withdraws the fingers 121 to the rear and permits the spring 114 to bring the compensator heads 115 into engagement with the glass. The cam 76, acting through the levers 82 and 83 and the other connections described above, permits the spring 75 to rock the cutting wheels into engagement with the glass, where they produce cuts of the depth determined by engagement of the screws 113 with the compensator arms 110. Thereupon the cam 76 causes the cutting wheel frames to rock in the reverse direction thereby removing the cutting wheels from the glass. While the cutting wheels are thus separated from the glass, the intermittent pinion 35 acts through the large intermittent gear wheel 36, the hollow chuck shaft 7 and the clutch member 207, to give the chuck a partial rotation which presents a new surface for the action of the cutting wheels 40. This operation continues until the chuck has made one complete revolution, whereupon the throwout member 26, which is carried by the chuck shaft 7 causes the detent 22 to withdraw from the clutch lever 17 and permits the spring 18 to disengage the clutch on the main drive shaft 8. The release of the clutch member 17 also releases the shaft lever 126, permitting the fingers 121 to be pushed forward by the spring 123 thereby separating the compensator heads 115 from the surface of the glass. At this time, or shortly thereafter, the contact wheel 216 of the motor 162 runs beneath the contact shoe 215, thereby energizing the motor 162 and starting the banding wheels in operation through the connections described above. At the same time the intermediate hollow chuck shaft 130 is set in continuous rotation through the clutch member 200, the pinions 205 and the gear 206, the result being that the chuck is given one or more complete revolutions while the banding wheels are in contact with the glass. Thereafter the banding wheels are raised from the glass by the lifter 181, the motor 162 is stopped, and the chuck jaws are again released by pressure applied to the head 149. The finished tumbler may then be removed and replaced by a new tumbler before the next cycle of operations begins.

The operation may be varied, if desired, by first causing the banding wheels to put the bands upon the tumbler and then applying the wreath by means of the cutting wheels 40. It is generally more convenient, however, to apply the wreath first and to finish the tumbler by applying the bands.

Numerous other variations may be resorted to without departing from my invention. Thus the number of banding wheels may be greater or less than three. They may be spaced apart to any extent desired, or may be entirely omitted if the ware is not to be banded. Likewise, the machine may be used as a simple bander, if desired, by merely removing the cutting wheels 40, and the chuck shaft may be given a lengthwise movement while the cutting wheels are in action so as to produce a spiral cut or a spiral series of cuts upon the glass. The designs which may be applied to the glassware by this machine are very numerous and the machine may be quickly changed to produce the various designs by the simple adjustments described above.

I have shown and described a construction and arrangement of parts which have been found to be highly efficient, but I desire that it be understood that my invention is not restricted to the precise proportions or arrangements herein shown and that no limitations are to be imposed upon my invention unless indicated in the appended claims.

I claim as my invention:

1. A glass cutting machine comprising a chuck, cutting wheels arranged to move toward and away from said chuck, pivotally mounted supports for said cutting wheels, a spring connecting said supports and acting to move said cutting wheels toward said chuck, and independent connections between said cam and said supports for moving said cutting wheels away from said chuck, each of said connections comprising a bell crank lever arranged to be oscillated by said cam, and a link of adjustable length connecting said bell crank lever with its cutting wheel support.

2. A glass cutting machine comprising a chuck, cutting wheels arranged to move toward and away from said chuck, pivotally mounted supports for said cutting wheels, a spring connecting said supports and acting to move said cutting wheels toward said chuck, and independent connections between said cam and said supports for moving said cutting wheels away from said chuck, the said connections comprising two pivoted levers having rollers adapted to run on said cam, springs for holding said rollers in engagement with said cam, two bell-crank levers mounted coaxially, links connecting said first-named levers with said bell-crank levers, and links of adjustable length connecting said bell-crank levers with said cutting wheel supports.

3. A glass cutting machine comprising a chuck, cutting wheels arranged to move toward and away from said chuck, pivotally mounted supports for said cutting wheels, a spring connecting said supports and acting to move said cutting wheels toward said chuck, and independent connections between said cam and said supports for moving said cutting wheels away from said chuck, said connections comprising two levers pivoted on a common axis and arranged side by side, rollers carried by said levers and adapted to run on said cam, springs for holding said rollers in contact with said cam, two bell-crank levers coaxially mounted on a stationary axis and having parallel arms, links connecting the parallel arms of the said bell crank lever to the first-named pivoted levers, and links connecting the other arms of said bell-crank levers to the said cutting wheel supports, said last-named links including turn-buckles for adjusting the effective lengths of said links.

4. A glass cutting machine comprising a chuck, cutting wheels arranged to move toward and away from said chuck, supports for said wheels and means for adjusting said supports angularly with respect to the axis of said chuck.

5. A glass cutting machine comprising a chuck, cutting wheels arranged to move toward and away from said chuck, supports for said cutting wheels, and adjustable eccentrics for pivotally supporting said supports.

6. A glass cutting machine comprising a chuck, cutting wheels arranged to move toward and away from said chuck, frames carrying said cutting wheels and comprising spaced upright supports, and eccentrics upon which the lower ends of said supports are mounted.

7. A glass cutting machine comprising a chuck, cutting wheels arranged to move toward and away from said chuck, frames carrying said cutting wheels and comprising spaced upright supports, eccentrics upon which the lower ends of said supports are mounted, and means for adjusting the position of said eccentrics lengthwise with respect to said chuck.

8. A glass cutting machine comprising a chuck, cutting wheels arranged to move toward and away from said chuck, frames carrying said cutting wheels and comprising spaced vertical supports, eccentrics upon which the lower ends of said supports are mounted, horizontal shafts carrying said eccentrics, means for adjusting said shafts lengthwise with respect to said chuck, and set collars adjustably pinned to said shafts for securing said shafts in their adjusted position.

9. A glass cutting machine comprising a chuck, a cutting wheel adapted to move toward and away from said chuck, a support for said cutting wheel, means for adjusting said support to vary the relation between said cutting wheel and said chuck, and indicating means for showing the relation between said cutting wheel and said chuck and for thereby enabling the said machine to be set up for producing different designs without preliminary trials.

10. A glass cutting machine comprising a base, a chuck mounted on said base, cutting wheel frames arranged on opposite sides of said chuck and movable toward and away from said chuck, shafts carried by said frames, cutting wheels carried by said shafts, and means for varying the angular positions of said shafts, comprising curved slots formed in said base and bolts extending into said slots and adapted to secure said frames to said base.

11. A glass cutting machine comprising a chuck, a cutting wheel movable toward and away from said chuck, and means for causing said cutting wheel to produce cuts of uniform depth in a glass article carried by said chuck, the said means comprising a stop member pivotally mounted independently of the cutting wheels and having one of its ends adapted to engage the surface of said article, an adjustable member movable with said cutting wheels and adapted to engage said stop member intermediately of its pivot point and said article-engaging end, means for automatically moving said stop member into engagement with the glass when the cutting operation begins, and means for automatically removing said stop member from the glass after the cutting operation is finished.

12. A glass cutting machine comprising a chuck, cutting wheels arranged to move toward and away from said chuck on opposite sides thereof, two stop members arranged on opposite sides of said chuck and mounted on stationary pivots, a spring connecting said stop members, and adjustable members movable with said cutting wheels and adapted to engage said stop members and to thereby limit the movement of said cutting wheels toward said chuck, means for separating said stop members when the machine is stopped, and means for releasing said stop members when the machine is started, and thereby permitting said spring to move said stop members into engagement with the glass.

13. A glass cutting machine comprising a chuck, a chuck shaft, cutting wheels arranged on opposite sides of said chuck and movable toward and from said chuck, two stop members arranged on opposite sides of said chuck and mounted on stationary pivots, a spring connecting said stop members and acting to move said stop members into engagement with a glass article carried by said chuck, adjustable members movable with said cutting wheels and adapted to engage said stop members and to thereby limit the movement of said cutting wheels toward said chuck, a collar surrounding said chuck shaft, fingers extending in opposite directions from said collar, members carried by said stop members and adapted to be engaged and moved apart by said fingers, means for withdrawing said fingers from said stop members when the machine is started, and means for automatically moving said fingers toward said stop members when the machine is stopped.

14. A glass cutting machine comprising a chuck, a chuck shaft, cutting wheels arranged on opposite sides of said chuck shaft and movable toward and away from said chuck, two stop members mounted on stationary pivots on opposite sides of said chuck and adapted to engage a glass article carried by said chuck, a spring connecting said stop members, adjustable members movable with said cutting wheels and adapted to engage said stop members, arms projecting from said stop members, a collar surrounding said chuck shaft and movable slidably thereon toward and away from said chuck, a spring tending to move said collar toward said chuck and toward the arms carried by the said stop members, fingers extending in opposite directions from said collar and having inclined surfaces adapted to engage and separate said arms, a shifting lever connected to move said collar away from said arms when the machine is started, means for releasing said lever when the machine is stopped.

15. A glass cutting machine comprising a chuck mounted for rotative movement about a fixed axis, a design-cutting wheel movable toward and away from said chuck, a banding wheel also movable toward and away from said chuck, means for rotating said chuck intermittently in the intervals between engagement of the said cutting wheel with an article carried by said chuck, and means for rotating said chuck continuously while said banding wheel is in engagement with a glass article carried by said chuck.

16. A glass cutting machine comprising a chuck, design-cutting wheels arranged on opposite sides thereof, means for rotating said chuck intermittently, and for moving said cutting wheels toward and away from said chuck, a banding device, means for automatically stopping the operation of said design-cutting wheels and the intermittent rotation of said chuck, and means for thereafter rotating said chuck continuously and for moving said banding device toward said chuck.

17. A glass cutting machine comprising a chuck, a design-cutting wheel movable toward and away from said chuck, a banding device also movable toward and away from said chuck, automatic means for lifting said banding device away from said chuck during the operation of said cutting wheel, and automatic means for lowering said banding device toward said chuck and for simultaneously rotating said chuck continuously.

18. A glass cutting machine comprising a chuck, a cutting wheel mounted for movement toward and away from the chuck, and means for adjusting said cutting wheel in a direction at right angles to the line of said movement and transversely of the longitudinal axis of the chuck.

In testimony whereof I the said JAMES BOYD GREER have hereunto set my hand.

JAMES BOYD GREER.